United States Patent [19]
Deguchi et al.

[11] Patent Number: 6,075,633
[45] Date of Patent: Jun. 13, 2000

[54] LIGHT TRANSMISSION SYSTEM

[75] Inventors: Hiroyuki Deguchi, Kawasaki; Shin-ichirou Harasawa, Hachioji, both of Japan

[73] Assignee: Fujitsu Limited, Kawasaki, Japan

[21] Appl. No.: 08/885,874

[22] Filed: Jun. 30, 1997

[30] Foreign Application Priority Data

Jan. 31, 1997  [JP]  Japan ................................. 9-019423

[51] Int. Cl.⁷ ........................... H04B 10/00; H04B 10/02; H04J 14/02
[52] U.S. Cl. ........................ 359/133; 359/177; 359/124
[58] Field of Search .................... 359/110, 177, 359/179, 174, 133

[56] References Cited

U.S. PATENT DOCUMENTS

| | | | |
|---|---|---|---|
| 5,436,750 | 7/1995 | Kawano | 359/177 |
| 5,801,863 | 9/1998 | Fatehi et al. | 359/124 |
| 5,828,801 | 10/1998 | Sakamoto | 385/24 |
| 5,920,414 | 7/1999 | Miyachi et al. | 359/133 |

*Primary Examiner*—Jason Chan
*Assistant Examiner*—Dalzid Singh
*Attorney, Agent, or Firm*—Staas & Halsey LLP

[57] ABSTRACT

In a light transmission system, each terminal equipment amplitude-modulates an optical main signal with a supervisory control signal of a proper frequency allocated to respective repeating installations. The repeating installations which have received the optical main signal demodulate the supervisory control signal from the optical main signal. The repeating installations detect that the supervisory control contains the own frequency component to judge it as a supervisory control signal addressed to the own installation from the terminal equipment. Alternatively, a branching installation is provided to extract the supervisory control signal before being coupled by an optical coupler in the branching installation, and amplitude-modulates the optical main signal at the output of the optical coupler with the supervisory control signal.

11 Claims, 13 Drawing Sheets

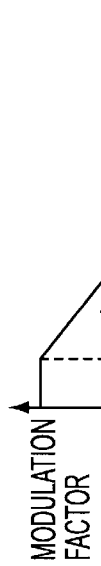
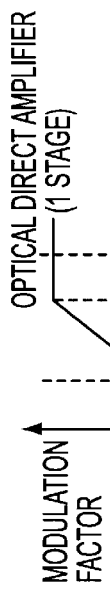
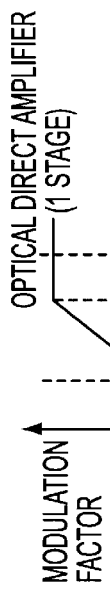
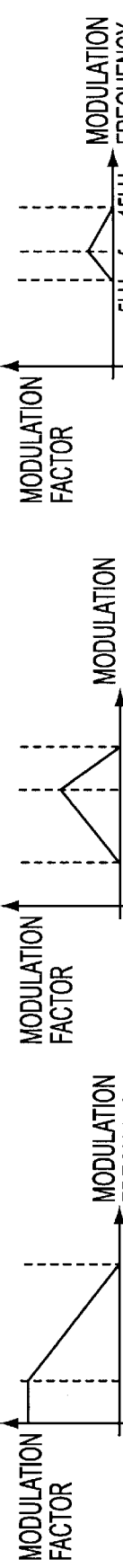
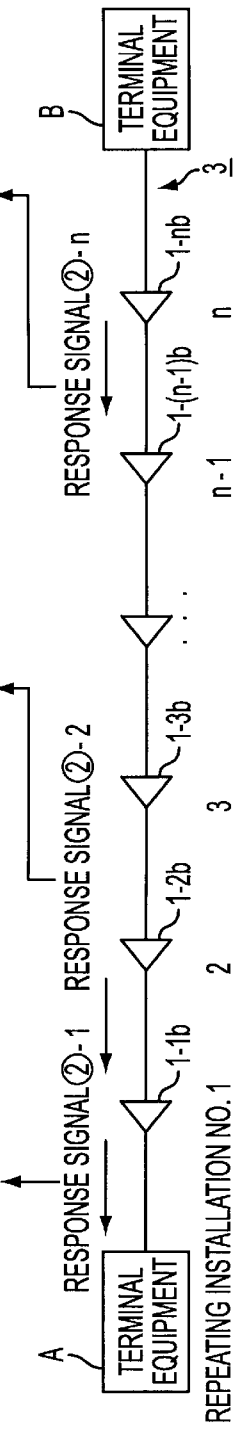

LIGHT TRANSMISSION SYSTEM

BACKGROUND OF THE INVENTION

1. Field of the Invention

The present invention relates to a light or optical transmission system which performs a light repeating (relaying) transmission with optical repeaters or repeating installations including an optical direct amplification, and to a monitor control of optical repeaters used for the light transmission system.

In particular, the present invention is available for a system such as an optical submarine transmission system networked with a submarine repeater which amplifies an attenuated optical signal in a transmission line and a submarine branching installation where the transmission line is branched in the submarine to branch the signal into plural terminal equipments.

2. Description of the Related Art

FIG. 14 shows one example of a conventional light transmission system which has an optical repeater. In this example, a terminal equipment A is connected to a terminal equipment B through a light transmission line 3 into which "n" repeating installations 1-1~1-n are inserted. In each of the repeating installations 1-1~1-n component repeaters 1-1a-1-na including optical amplifiers are provided in the upstream direction and repeaters 1-1b~1-nb including optical amplifiers are provided in the downstream direction.

These light amplifiers perform an optical direct amplification of an optical signal inputted from the upstream side. Recently, a lot of optical fiber amplifiers are used as a light amplifier performing the optical direct amplification. This optical fiber amplifier is generally known as the one in which the optical signal is inputted to the optical fiber with excitation light from an excitation light source put in an optical fiber doped with rare-earth element.

To specify the respective repeating installations 1-1~1-n respectively, proper repeating installation numbers (for instance, "1" to "n") are allocated.

This prior art light transmission system is arranged such that the light of a single wavelength is transmitted with respect to a single optical fiber from the transmitting to the receiving terminal equipment.

Also, in preparation for the case where the repeating installation and the branching installation are failed, a monitor control function is provided to deal with the failure by rapidly specifying the failed portion in such a light transmission system.

For instance, in order to observe operating conditions of the current, the excitation power, the repeating input power, and the output power etc. of an excitation laser diode (not shown) in the repeating installations 1~3, the optical main signal on the down line is amplitude-modulated with a supervisory control signal ① having digitally modulated information of the proper number "3" and the command number of the repeating installations 1~3 from the land terminal equipment A.

The repeating installations 1-1~1-n receive this AM signal, demodulate the supervisory control signal ①, and detect the proper number of the repeating installation. Only the repeating installations 1~3 designated by the proper number "3" respond to the supervisory control signal ①. The optical main signal on the up line is amplitude-modulated with the own operating condition information (monitor signal) based on the command number, and transferred to the termnial equipment A as a response signal ②.

The terminal equipment A receives this response signal ② and will recognize the operating condition of the repeating installations 1~3. Similarly, the terminal equipment A can transfer the operating condition information of the repeating installation back to the own equipment by designating the proper number of other repeating installations.

Meanwhile, as the quantity of data transmission increases recently, the wavelength division multiplexing WDM technology in which optical signals of more than two waves are multiplexed into a single optical fiber at a terminal equipment is being utilized.

In this technology, the above-mentioned supervisory control signal is superimposed to the optical main signal at not only a specific wavelength but also all wavelengths. If the supervisory control signal is superimposed only at the specific wavelength, the modulation factor of the signal of the wavelength will be largely changed.

The purpose of this measure is to prevent the main signal of the wavelength from being deteriorated than that of the other wavelengths due to the supervisory control signal.

In this case, there has been proposed an optical branching and repeating transmission taking advantage of the difference of each wavelength, as shown by the dotted line in FIG. 14.

The branching installation in a system for optical branching and repeating operations using the wavelength division multiplexing technology is shown in FIG. 15. While this branching installation is shown in FIG. 14 in the form of a submarine branching installation 2 (ADM-BU) of a wavelength division multiplexing type installed in a sea cable, it branch the optical signal of "m" waves among "n" waves in a single optical fiber 3a transmitted from the terminal equipment A to a single optical fiber 3b in a branch device 4 in FIG. 15 and transmits the branched signal to a terminal equipment C. Moreover, an optical coupler 5 couples or synthesizes the optical signals of "m" waves in an optical fiber 3c from the terminal equipment C and of the "n-m" waves of the remainder not branched in the branch device 4. The coupled signal is transmitted to a terminal equipment B through a single optical fiber 3d.

The prior art in FIG. 15 shows an example where the wave number "n" is 8 and "m" is 7. The supervisory control signal ① shown by ★ sign is inputted to the branch device 4 in the form included in the optical main signal consisting of 8 waves from the terminal equipment A.

The 1st to 7th waves are branched to the terminal equipment C. The 1st to 7th waves transmitted from the terminal equipment C and the 8th wave from the branch device 4 are coupled in the optical coupler 5. Being included only in the 8 wave, the supervisory control signal will be transmitted to the terminal equipment B in the form in which the power of the signal light is decreased to ⅛.

Namely, when the supervisory control signal ① passes through the branching installation 2a, the SN ratio thereof will be decreased.

Thus, upon the optical branching and repeating transmission performed, the SN ratio of the supervisory control signal which passes through the branching installation 2 or 2a is decreased as the branched wave number increases. It is required to enhance the power of the supervisory control signal ① transmitted from the terminal equipment A "eight" times in the example of FIG. 15 in order to exactly receive and demodulate the signal ① at a latter repeating installation 1, and to identify the proper number and the command number of the repeating installation.

However, such a system where the power of the supervisory control signal ① is enhanced in the terminal equipment A, the modulation factor of the supervisory control signal ① with respect to the optical main signal should be almost eight so that the transmission quality of the optical main signal is damaged, resulting in that this system can not be available.

SUMMARY OF THE INVENTION

It is accordingly an object of the present invention to provide a light transmission system which in an optical fiber connecting first and second terminal equipments, has one or more repeating installations and a branching installation which branches an optical signal from the first terminal equipment to a third terminal equipment and transfers an optical signal from the third terminal equipment to the second terminal equipment and in which a supervisory control signal is accurately communicated from the terminal equipment to the repeating installations.

[1] For the achievement of the above object, according to the present invention the first terminal equipment in this light transmission system comprises a proper frequency generator which generates a proper frequency allocated to each of the repeating installations as a supervisory control signal and modulates a light of a light source, and a modulator which the modulates an optical output of the proper frequency generator with a main signal and transmits the optical main signal to the optical fiber.

Each of the repeating installations has an extractor for detecting whether the proper frequency included in the optical main signal is a proper frequency allocated to each of the repeating installations.

Specifically, FIG. 1 shows one arrangement of a light transmission system according to the present invention. In this arrangement, proper frequencies f1~fn are preliminarily allocated to each of the repeating installations 1-1~1-$n$ by a proper frequency generator.

This point is different from the prior art shown in FIG. 14.

First of all, the terminal equipment does not transmit a supervisory control signal ① modulated to identify information on "Repeater number" and "Command number", different from the prior art. Instead, the supervisory control signal ① which is also an optical main signal ③ having modulated an optical main signal ③ as shown in FIG. 2 in the optical modulator with proper frequency signals ④ shown by the dotted line corresponding to the repeating installations.

On the other hand, the repeating installations demodulate the supervisory control signal from the optical main signal in the extractor. By only detecting whether the own frequency component is present in the supervisory control signal, the repeating installation can recognize the signal being addressed to itself.

Namely, there repeating installations need not demodulate and decode the supervisory control signal which contains extra information such as "Repeater number" and "Command number", different from the prior art, but only have to determine whether the own proper frequency component is present in the supervisory control signal.

As a result, the SN ratio necessary to transmit and receive the supervisory control signal accurately between the terminal equipment and the repeating installations is rendered smaller than the prior art.

[2] In the above present invention [1], the extractor may be formed of an optical coupler which takes out a part of the optical main signal, a photo diode circuit which transduces the output of the optical coupler into an electric signal, a band pass filter circuit which extracts a frequency band component of the supervisory control signal in the electric signal, and a supervisory control signal detector which detects the proper frequency component allocated to itself in the frequency band component.

[3] Also, in the above present invention [1] or [2], when the supervisory control signal is judged by the extractor, the repeating installation may modulate the optical main signal to be transmitted to the terminal equipment which has transmitted the supervisory control signal from the repeating installation, and transfers a response signal for monitor control.

[4] Also, in the above present invention [3], it is preferable to select the modulating frequency of the response signal between 5 kHz and 15 kHz.

Namely, the higher the modulating frequency, the worse the modulation efficiency of the optical direct amplifying modulator normally used in the repeating installation.

The gain response characteristic of the amplifier in the optical direct amplifying modulator decreases in a lower frequency. Then, it has been determined by experiments that the modulating frequency of the response signal is available in the abovementioned range.

[5] Also, in the above present invention [3] or [4], the response signal may be to modulate the monitor control result in the repeating installation in the form of PCM data to modulate the optical main signal.

[6] Also, in the above present invention [1], the same frequency as the proper frequency allocated to the repeating installation provided between the first terminal equipment and the branching installation may be allocated as a proper frequency of the repeating installation provided between the branching installation and the third the terminal equipment.

Namely, in the presence of a transmission line branched by the branching installation, the proper frequency of the supervisory control signal allocated to each of the repeating installations from the 3rd branched terminal equipment to the branching installation is allocated in duplicate to the repeating installation from the 1st terminal equipment to the branching installations, whereby the number of the proper frequency of the supervisory control signal can be reduced.

[7] The present invention alternatively may provide a light transmission system, in an optical fiber connecting first and second terminal equipments, which has one or more repeating installations and a branching installation which branches an optical signal from the first terminal equipment to a third terminal equipment and transfers an optical signal from the third terminal equipment to the second terminal equipment.

The above branching installation may comprise an extractor which extracts a supervisory control signal contained in an optical signal to be transmitted from the first to the second terminal equipment; and an optical amplifying modulator which controls a gain of a light amplifier by the supervisory control signal extracted by the extractor and modulates the optical signal from the third terminal equipment with the supervisory control signal.

Namely, the extractor extracts the supervisory control signal attenuated by the branch device. The optical main signal outputted from the optical coupler with the extracted supervisory control signal is amplitude-modulated in the optical amplifying modulator, thereby compensating for the attenuated part of the supervisory control signal which is to be transmitted to the next stage.

[8] In the above present invention [7], the extractor may be formed of an optical coupler which takes out a part of the optical main signal, a photo diode circuit which transduces an output of the optical coupler into an electric signal, and a band pass filter circuit which extracts a frequency band component of the supervisory control signal in the electric signal, and the optical amplifying modulator may be formed of an optical direct amplifier which amplifies entire optical output signal of an optical coupler and a modulator which modulates an amplification factor of the optical direct amplifier with an output signal of the band pass filter circuit.

BRIEF DESCRIPTION OF THE DRAWINGS

FIG. 10 is a graph for illustrating frequency characteristics of a response signal used for a light transmission system according to the present invention;

Throughout the figures, the same reference numerals indicate identical or corresponding portions.

DESCRIPTION OF THE PREFERRED EMBODIMENTS

Figure 1:
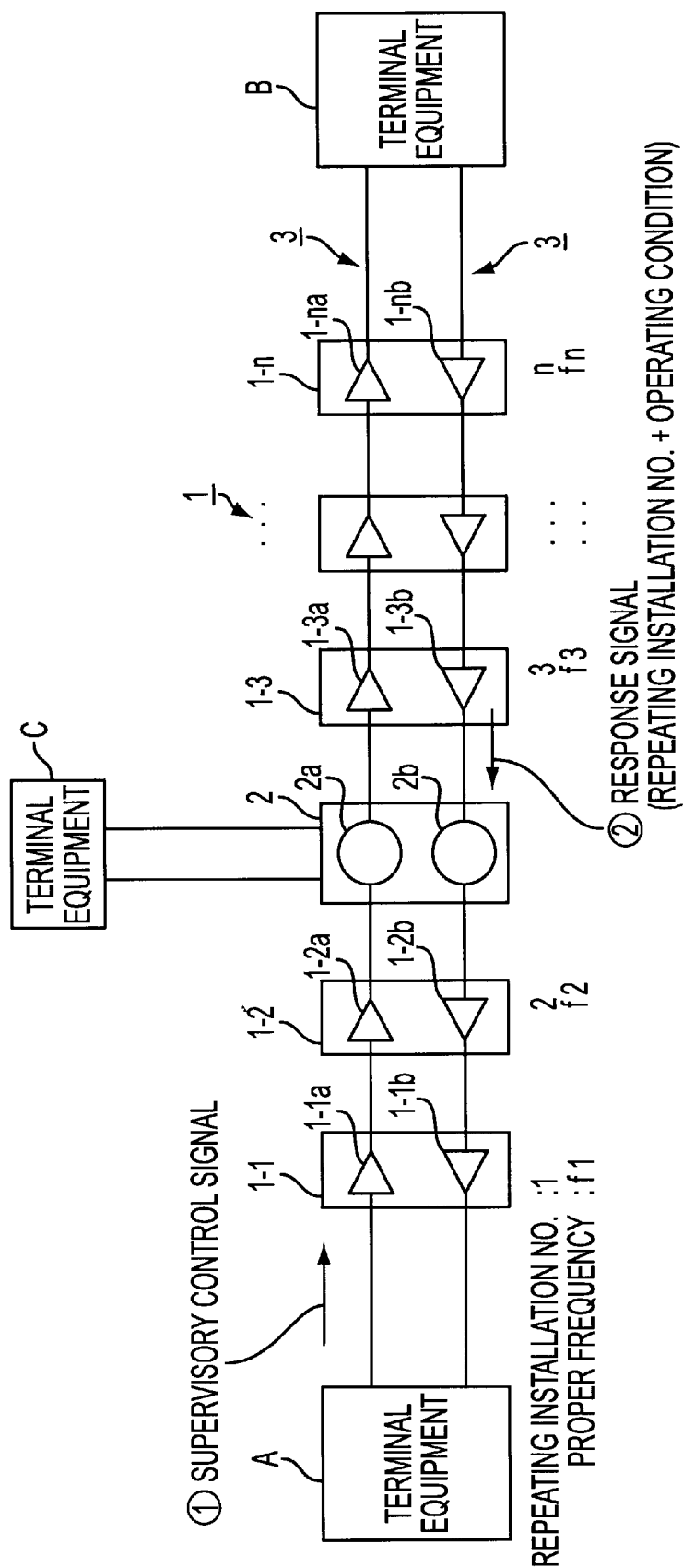
FIG. 1 is a block diagram showing an arrangement of a light transmission system according to the present invention.
Figure 3:
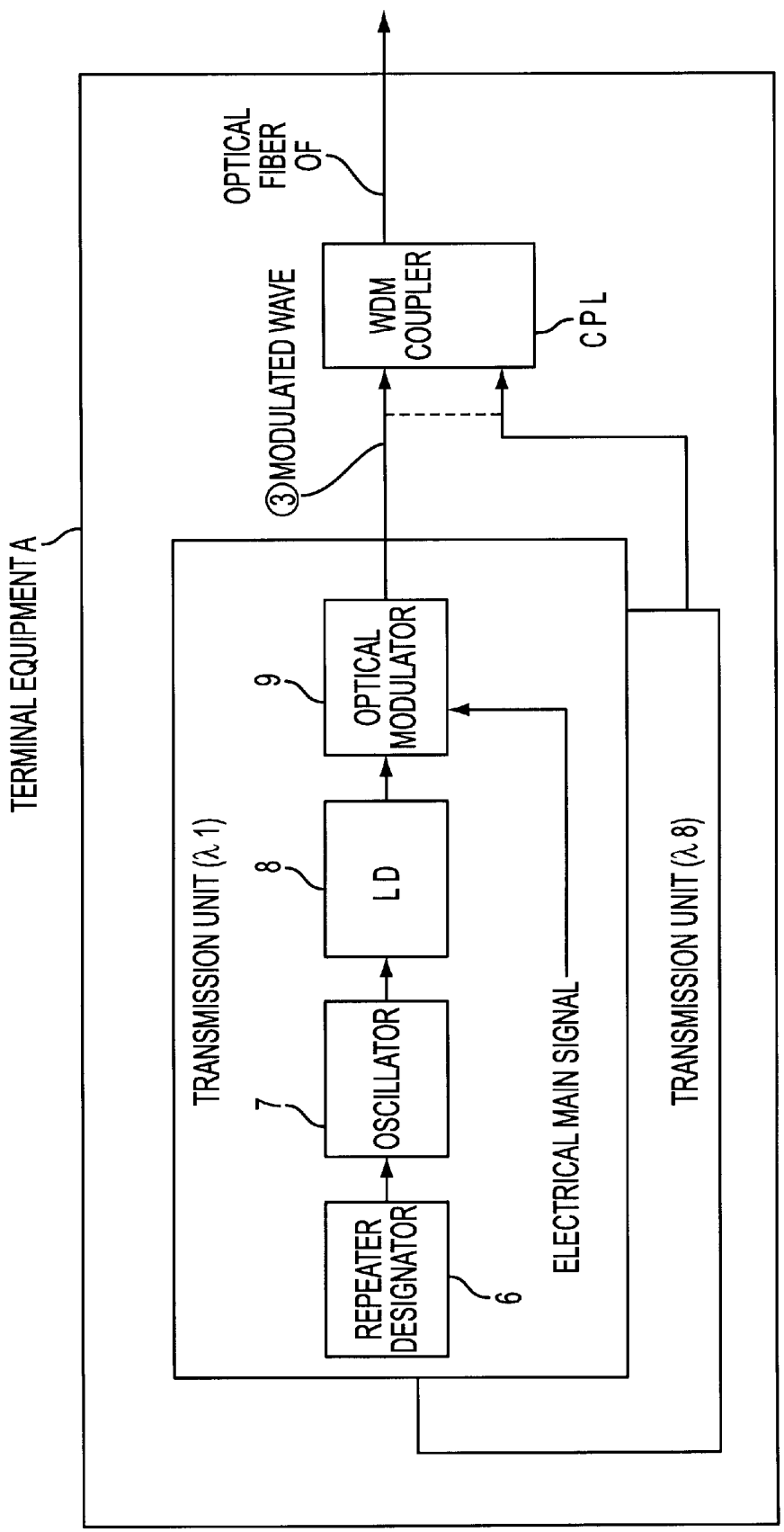
FIG. 3 is a block diagram showing an arrangement of a terminal equipment in a light transmission system according to the present invention.

FIG. 3 shows one embodiment of the above-mentioned terminal equipment A in the light transmission system according to the present invention. In this embodiment a repeating installation designator 6, an oscillator 7, a laser diode circuit 8, and an optical modulator 9 are serially connected in this order. The main signal (electric signal) is given to an optical modulator 9, from which the optical main signal ③ (modulated wave) is transmitted to the terminal equipment B (see FIG. 1).

It is to be noted that the combination of the designator 6, the oscillator 7, and the laser diode circuit 8 form a proper frequency generator.

In the terminal equipment A, when the designator 6 designates repeating installations, e.g. the repeating installations 1~3, which are required to transmit the supervisory control signal to the oscillator 7, the oscillator 7 oscillates with a proper frequency f3 assigned to the repeating installations 1~3, and transmits the output signal to the laser diode circuit 8 as a current output.

The laser diode circuit 8 which has received this current signal performs the electro-optical conversion and the output is supplied to the optical modulator 9 in the form of an optical signal which is amplitude-modulated with the proper frequency f3.

The optical modulator 9 inputs the main signal and the AM optical signal from the laser diode circuit 8. An optical main signal is generated in which the former is modulated by the latter. After being wavelength-division-multiplexed by a WDM coupler CPL, the optical output signal is applied to an optical fiber OF.

Figure 2:
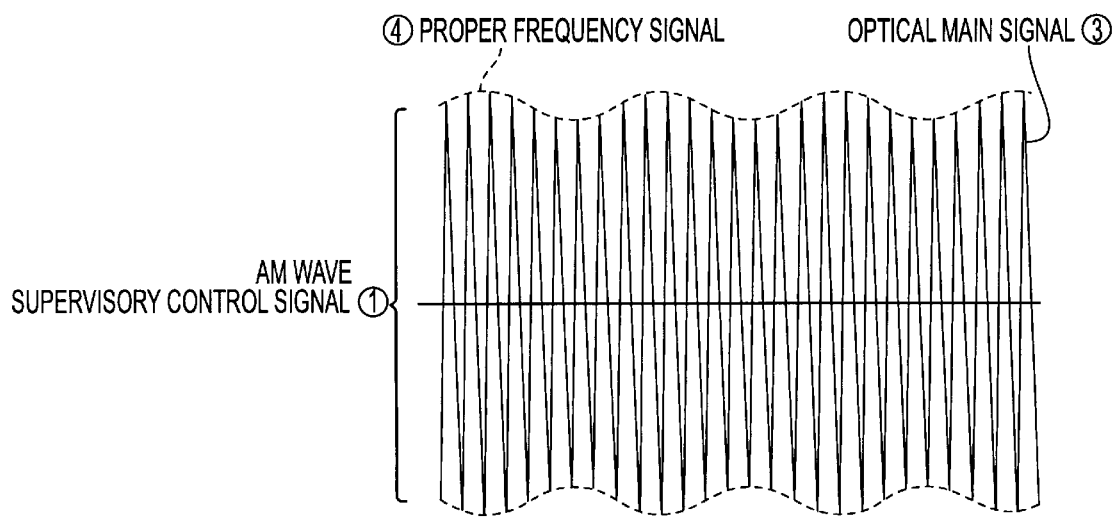
FIG. 2 is a waveform diagram showing an optical main signal modulated with a supervisory control signal used for a light transmission system according to the present invention.

This optical main signal has the light waveform described referring to FIG. 2 where the supervisory control signal ① for designating the repeating installations 1~3 from the terminal equipment A is generated.

Figure 4:
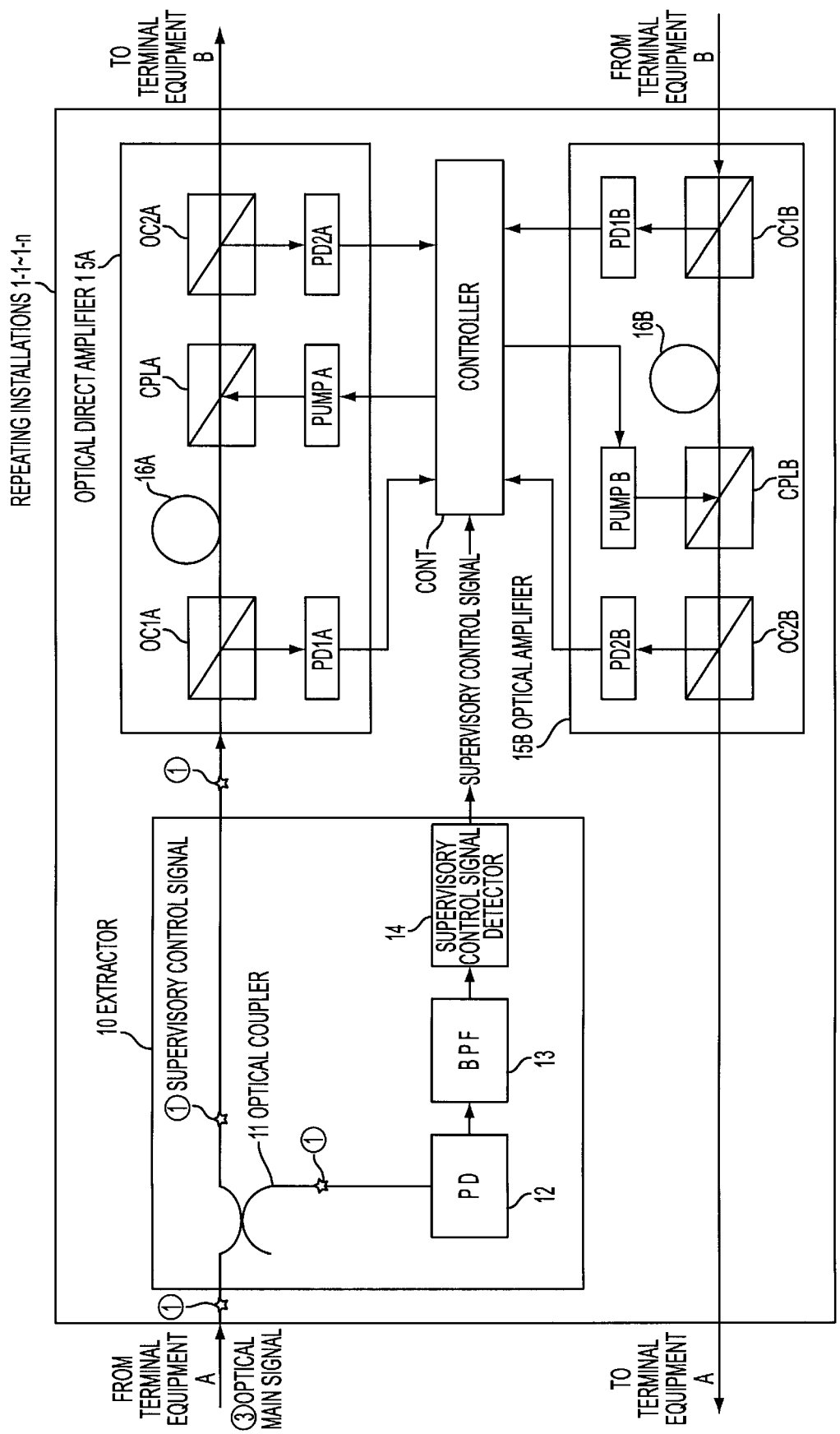
FIG. 4 is a block diagram showing an embodiment of a repeating installation which contains an extractor of supervisory control signal in a light transmission system according to the present invention.

FIG. 4 shows repeating installations 1-1~1-n which have an extractor 10 receiving the supervisory control signal ①. Hereinafter, only the arrangement of the repeating installations 1~3 will be described as one example.

This extractor 10 is formed of an optical coupler 11 which takes out a part of the optical main signal, a photo diode device 12 which transduces the output of the optical coupler 11 into an electric signal, a band pass filter circuit 13 which extracts the frequency band component of the supervisory control signal as an electric signal, and a supervisory control signal detector 14 which detects a proper frequency component assigned to itself in the frequency band component. The repeating installations 1~3 having received at the extractor 10 the supervisory control signal addressed to itself prepares, at a controller CONT, data for transferring, as the response signal ②, operating condition information (monitor signal) such as the current and the exciting power of an excitation LD (pumpA) in an optical direct amplifier 15A, repeated input power which is monitored with an optical coupler or separator OC1A and a photo diode PD1A and output power which is monitored with an optical coupler or separator OC2A and a photo diode PD2A, etc. The controller CONT modulates the output of an excitation LD (PumpB) in an optical direct amplifier 15B.

As for the modulating frequency of this response signal ②, it is general to use only a single frequency wave common to all repeating installations, will be described later.

Figure 5:
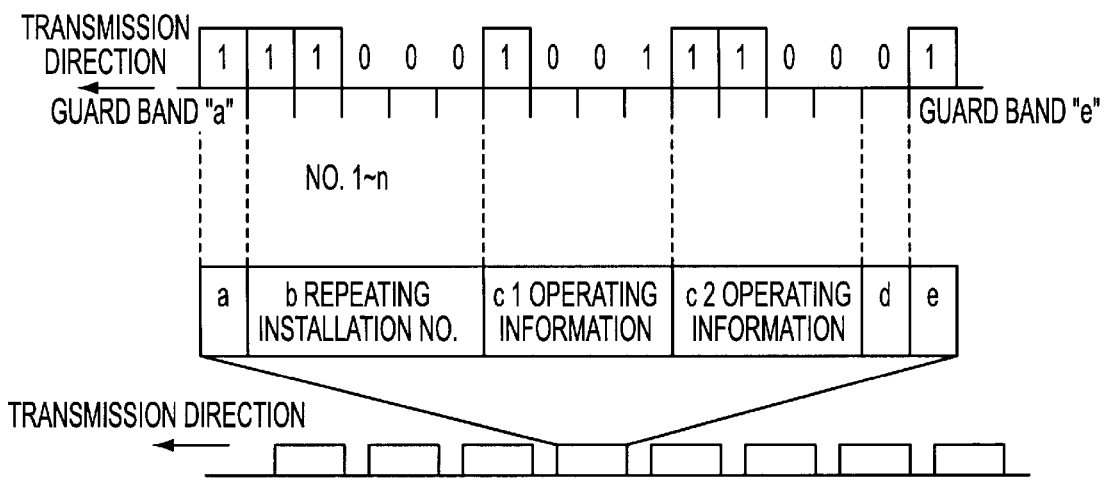
FIG. 5 is a diagram showing an example of PCM pattern of a response signal used for a light transmission system according to the present invention.

FIG. 5 shows an example of transmitted pattern of the response signal. The response signal is formed of 16 bits in combination comprising a front guard band "a" of 1 bit, a repeating installation number "b" of 5 bits, operating information c1, c2 of 4 bits respectively, a parity bit "d" of 1 bit, and a rear guard band "e" of 1.

The transmitted head bit is the front guard band "a". This front guard band "a" and the rear guard band "e" always have the value of "1".

The number "b" and the operating information c1 and c2 are transmitted first with the least significant bit (LSB). As for the value of respective data in this example, the number "b" is 3, the operating information c1 "1", the operating information c2 "3", and the parity is "0".

The maximum number of repeating installations which can be designated is "32" and this can be changed by adjusting the number of bits. It is also possible to add operating information c3, c4, . . . etc. between the operating information c2 and the parity bit "d".

The response signal is transmitted repeatedly for a period while the supervisory control signal is being received by the extractor 10. The terminal equipment A can confirm the presence of transmission errors by plural receptions of the response signal.

Figure 6:
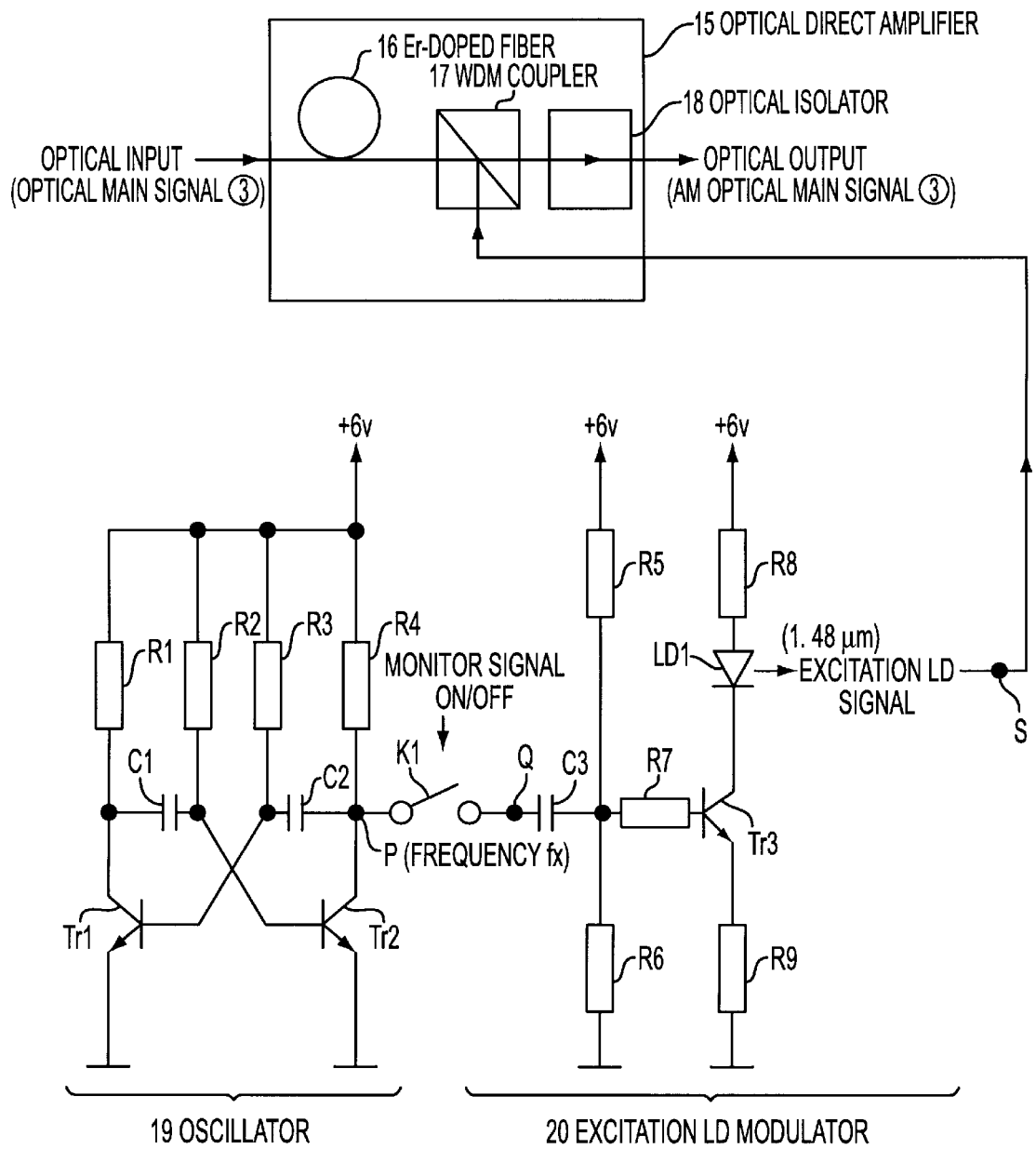
FIG. 6 is a block diagram showing an embodiment of a modulator in a repeating installation used for a light transmission system according to the present invention.

FIG. 6 shows a circuit arrangement in which the operating condition information monitor signal of the repeating installations is pulse-coded with the transmission format of FIG. 5 and the optical main signal of the line from the terminal equipment B towards the terminal equipment A is amplitude-modulated.

First of all, the optical direct amplifier 15B (light amplifier) on the up line is formed of an Er-doped fiber (EDF) 16, a wavelength division multiplexing (WDN type) optical coupler 17, and an optical isolator 18.

An oscillation output terminal P of an oscillator 19 is connected to an input terminal Q of a modulator 20 for exciting LD through a switch K1. An optical output terminal S of an excitation laser diode LD1 of the modulator 20 is connected to a modulating input portion of the WDM coupler 17.

It is to be noted that the oscillator 19 may be a well known multi-vibrator formed of resistors R1~R4, condensers C1, C2, and transistors Tr1, Tr2, and outputs the response signal of frequency fx at the output terminal P.

The excitation LD modulator 20 is formed of resistors R8, R9, a coupling condenser C3, voltage-dividing resistors R5, R6, a transistor Tr3, an input resistor R7 of the transistor Tr3, resistors R8, R9 forming the transistor Tr3, and the laser diode LD1.

Then the operation of this circuit arrangement will now be described.

By turning the switch K1 on/off according to the monitor signal, the modulating circuit 20 generates at the input terminal Q an output signal of the oscillator 19, that is a PCM-modulated signal with the response signal frequency fx which is generated by the controller CONT in FIG. 4.

This signal is amplified by the transistor Tr3 of the modulating circuit 20, and then it is transduced into the PCM optical signal by driving the laser diode LD1.

This PCM optical signal serves to modulate the amplification factor of the Er-doped fiber 16 through the WDM coupler 17 to transmit the response signal ② which have amplitude-modulated the optical main signal ③.

Figure 7:
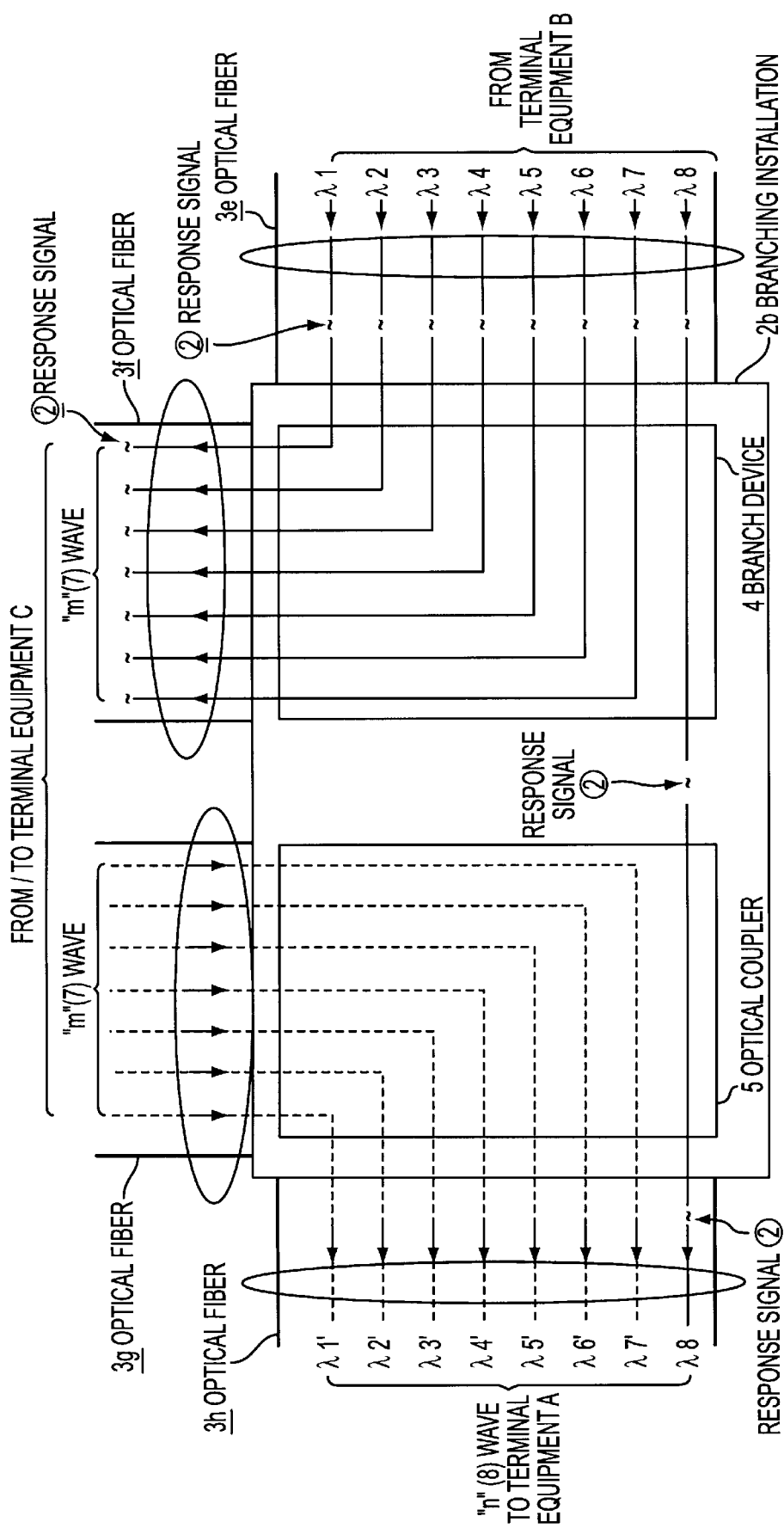
FIG. 7 is a block diagram showing an example of transmitting a response signal in a branching installation used for a light transmission system according to the present invention.

FIG. 7 shows an example where the response signal ② shown by ★ sign passes through the branching installation 2b.

Namely, optical signals λ1~λ7 among optical signals λ1~λ8 including the response signal ② in the optical fiber 3e transmitted from the terminal equipment B are branched in the branch device 4, and sent to a terminal equipment C through a single optical fiber 3f.

On the other hand, the optical signal λ8 not branched in the branch device 4 is inputted to an optical coupler 5, coupled with optical signals ~1'~λ7' excluding the response signal ② in a single optical fiber 3g from the terminal equipment C, and transmitted to the equipment A through a single optical fiber 3h.

However, the response signal ② passing through the branching installation 2b, the signal light power of the response signal ② is decreased to ⅛ in the same manner as the prior art supervisory control signal.

Figure 8:
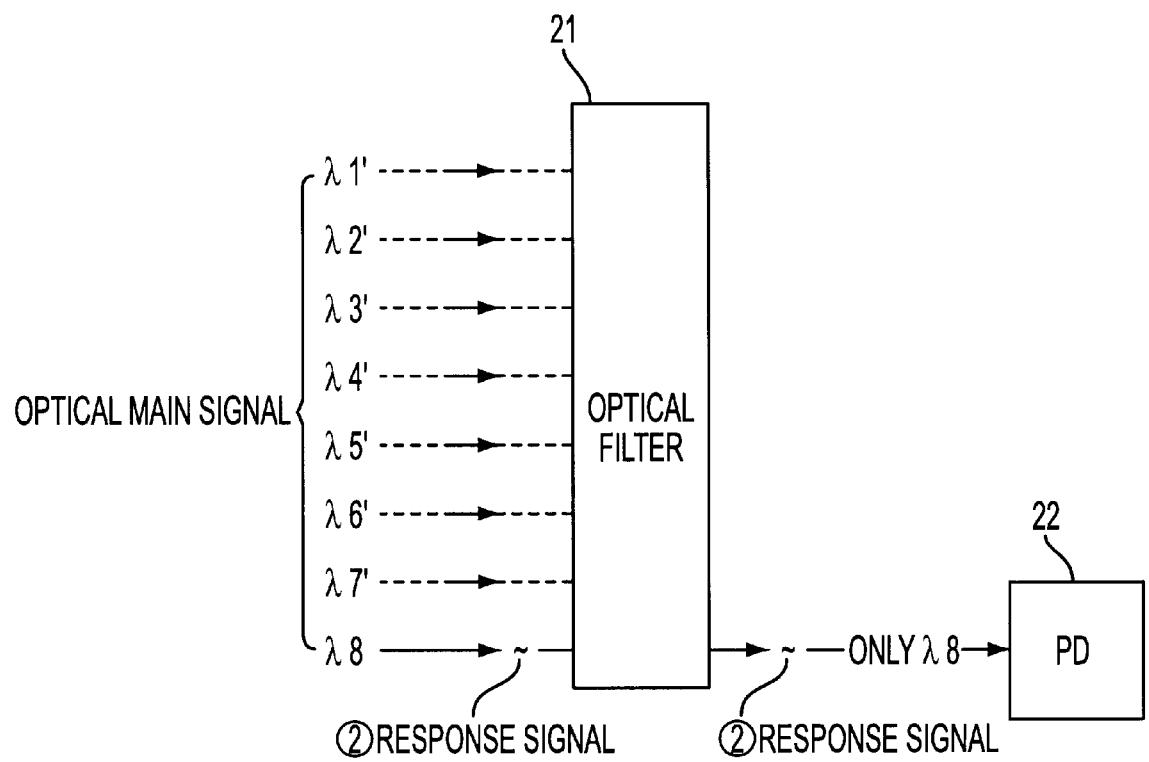
FIG. 8 is a block diagram showing an embodiment of an extractor for a response signal at a terminal equipment in a light transmission system according to the present invention.

FIG. 8 shows an example where the terminal equipment A having received the optical main signal including the response signal ② extracts the response signal ②.

Namely, the terminal equipment A extracts only the optical signal λ8 including the response signal ② at an optical filter 21. A photo diode circuit 22 performs a photoelectric conversion of the optical signal λ8 to output a corresponding electric signal.

Namely, the repeating installations need not demodulate and decode the supervisory control signal which includes extra information such as "Repeater number" and "Command number", different from the prior art, but rather only has to determine whether the own proper frequency component is present in the supervisory control signal. As a result, SN ratios necessary to accurately transmit and receive the supervisory control signal between the terminal equipment and the repeating installations can be made smaller than the prior art.

Figure 9:
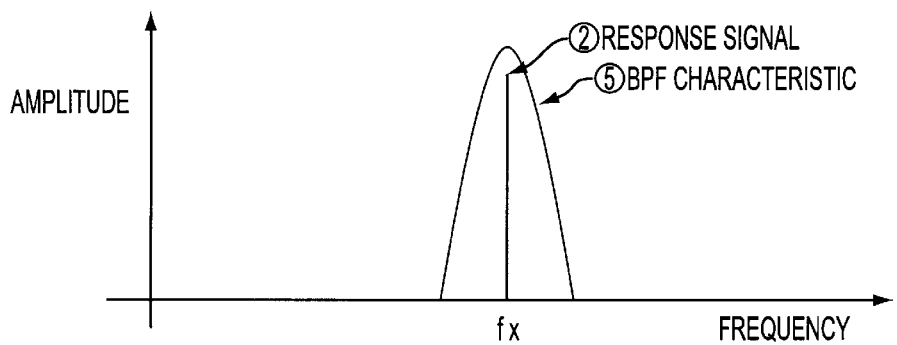
FIG. 9 is a graph showing an example of frequency characteristic of a filter which extracts a response signal at a terminal equipment in a light transmission system according to the present invention.

FIG. 9 shows a frequency characteristic of the band pass filter which extracts the response signal ② from the electric signal λ8 including the response signal ② as photoelectric-converted in FIG. 8. In the figure, the amplitude is scaled in the ordinate and the frequency in the abscissa.

The response signal is extracted by the band pass filter of characteristic ⑤ which complies with the response signal frequency fx, and demodulated by a demodulator which complies with the modulation method, i.e. PCM in this embodiment.

In addition, the terminal equipment A decodes the response signal ② according to the transmitted pattern illustrated in FIG. 5. When the repeating installation number designated with the supervisory control signal ① and the said number in the response signal ② are coincident, the terminal equipment A can confirm that the supervisory control signal ① has been accurately transmitted, and recognize the operating condition of the designated repeating installation.

It is to be noted that an amplitude or frequency modulation may be substituted for the PCM adopted in the embodiment for the modulation method of the response signal.

FIGS. 10A~10H show characteristic graphs obtained by the experiments for deciding the value of frequency fx in which transmits the above-mentioned response signal with a maximum efficiency is transmitted. Each graph has scales of modulating frequency, i.e. oscillation frequency of the oscillator 19 in FIG. 6 in the abscissa and modulation factor of the output power of the optical direct amplifier in the ordinate.

FIG. 10I shows that the terminal equipments A and B are connected with the up stream light transmission line 3 through the repeaters 1-1b~1-nb. However, different from FIG. 1, the down stream light transmission line 3 and the repeaters 1-1a~1-na are omitted The response signal ②-1 transferred from the repeater 1-1b is modulated by the optical direct amplifier in the repeater 1-1b (see FIG. 6), and then directly reaches the terminal equipment A.

The modulating characteristic of the optical direct amplifier at this point by the modulation of the excitation laser diode in the repeater 1-1b is shown in FIG. 10A. The upper frequency limit of this modulation characteristic is due to the decay or relaxation time constant of milli-second order for excited Erbium ions in the Erbium doped fiber amplifier. The characteristic of the response signal ②in FIG. 10F is the same as that in FIG. 10A because there is no repeater or optical direct amplifier at a latter stage.

Furthermore, the response signal ②-2 transferred from the repeater 1-2b is modulated by the optical direct amplifier in the repeater 1-2b, and reaches the terminal equipment A through the optical direct amplifier in the repeater 1-1b.

Accordingly, the characteristic of the response signal ②-2 in FIG. 10G is a combination of the modulating characteristic of the optical direct amplifier in the repeater 1-2b shown in FIG. 10B and the amplification characteristic of the optical direct amplifier in the repeater 1-1b in the next stage shown in FIG. 10D. The lower frequency limit of this amplification characteristic is also attributed to the decay time constant of the excited Erbium ions in the optical direct amplifier.

In the same way, the response signal ②-n transferred from the repeater 1-nb is modulated by the optical direct amplifier in the repeater 1-nb, and reaches the terminal equipment A through the "n-1" number of optical direct amplifiers in the repeaters 1-(n-1)b~1-b.

Therefore, the characteristic of the response signal ②-n shown in FIG. 10H is a combination of the modulating characteristic of the optical direct amplifier in the repeater 1-nb shown in FIG. 10C, and the amplification characteristic of the optical direct amplifier in the "n-1" number of repeaters among the repeaters 1-(n-1)b~1-1b shown in FIG. 10E

Thus, FIG. 10F showing the characteristic of the response signal ②-1 illustrates that the modulating frequency up to 15 kHz can serve to transmit the response signal to the terminal equipment. FIGS. 10G and 10H showing the characteristic of the response signal ②-2 illustrate that the response signal can be transmitted to the terminal equipment with the modulating frequency in the range of 100 Hz~15 kHz and 5~15 kHz, respectively.

Therefore, in view of the multi-staged optical repeaters, the modulating frequency of the response signal has preferably the range of 5~15 kHz with the center being the frequency fx at the maximum point shown in FIG. 10R.

Thus, the optimum frequency fx of the response signal relates to the frequency response characteristic of the optical direct amplifier in the repeating installation and the modulation efficiency of the output power of the amplifier with respect to the frequency of the excitation laser diode which modulates the optical direct amplifier.

Figure 11:
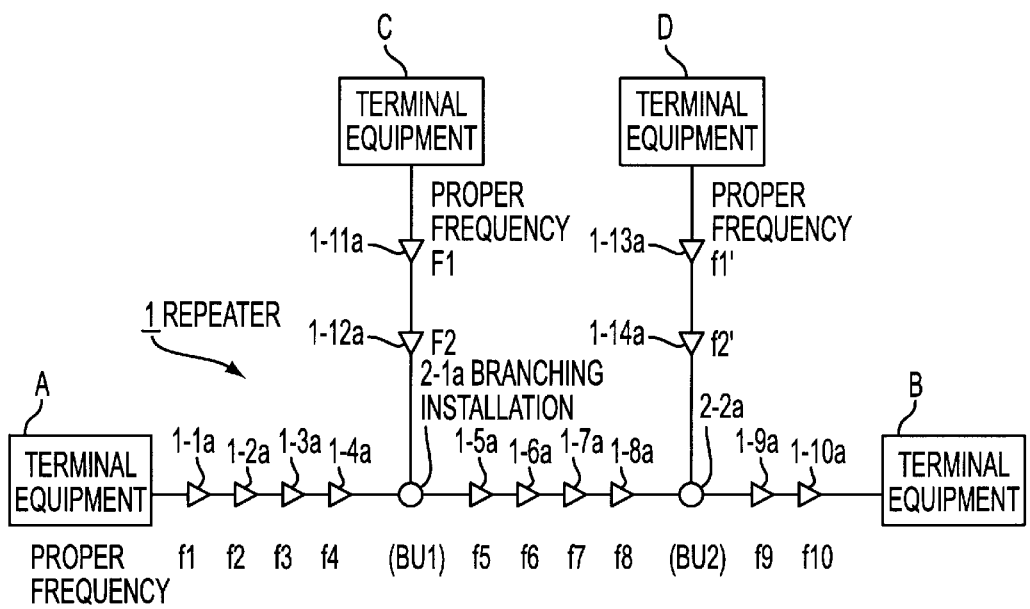
FIG. 11 is a block diagram showing a modified example of the frequency of a supervisory control signal when a branching installation is used in a light transmission system according to the present invention.

FIG. 11 shows a modified example of the proper frequency of the supervisory control signal allocated to each of the repeating installations when the branching installation is used.

Terminal equipments A and B are connected in series through the repeaters 1-1a~1-10a, and the branching installations 2-1a, 2-2a. The proper frequencies f1~f10 are allocated to each of the repeaters 1-1a~1-10a, respectively. The transmission direction is from the terminal equipments A to B as shown in FIG. 11.

In addition, the terminal equipment C is connected in series with the branching installation 2-1a through the repeaters 1-1a and 1-12a. The terminal equipment D is connected in series with the branching installation 2-2a through the repeating installations 1-13a and 1-14e. The transmission directions are from the terminal equipment C to the branching installation 2-1a and from the terminal equipment D to the branching installation 2-2a, as shown in FIG. 11.

In such an arrangement, since there is no influence in the latter stages even if the same frequency as the proper frequencies f1~f4 allocated to the repeating installations 1-1a~1-4a are used as frequencies f1, f2' allocated to the repeating installations 1-11a and 1-12a, transmission-reception of the supervisory control signal and the response signal can be faultlessly done.

This is similarly applied to proper frequencies f1, f2" allocated to the repeating installations 1-13a and 1-14a.

Thus, the number of the frequencies used as the supervisory control signal can be reduced, and the kind of a filter stored in the repeating installation can be limited, so that the cost of the repeating installation can be lowered.

Figure 12:
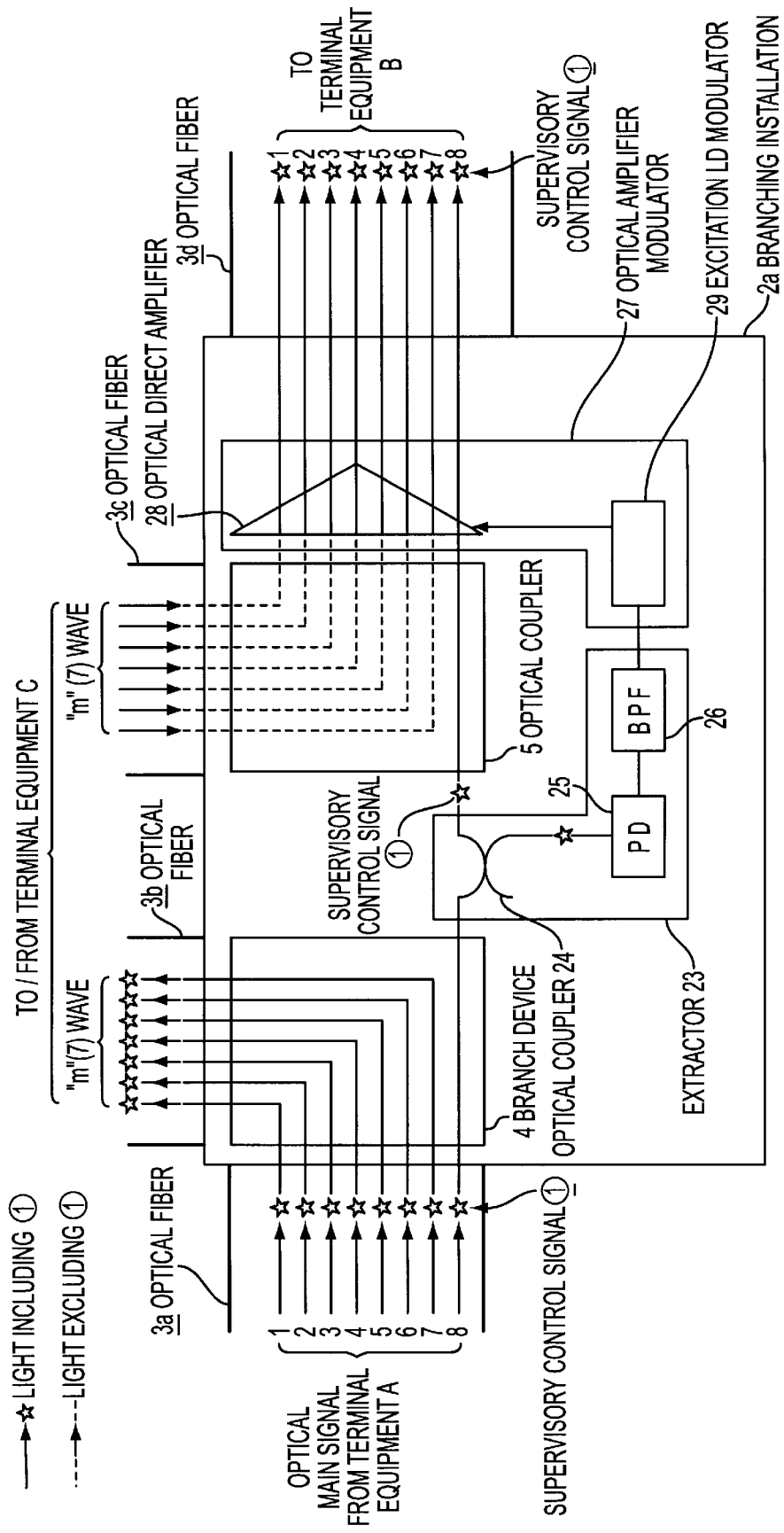
FIG. 12 is a block diagram showing an embodiment of a branching installation used for a light transmission system according to the present invention.

FIG. 12 shows an embodiment where in the branching installation 2a (see FIG. 1) the supervisory control signal ① shown by ★ sign that weakens the signal power since it is branched in the branch device 4 is amplified.

Figure 15:
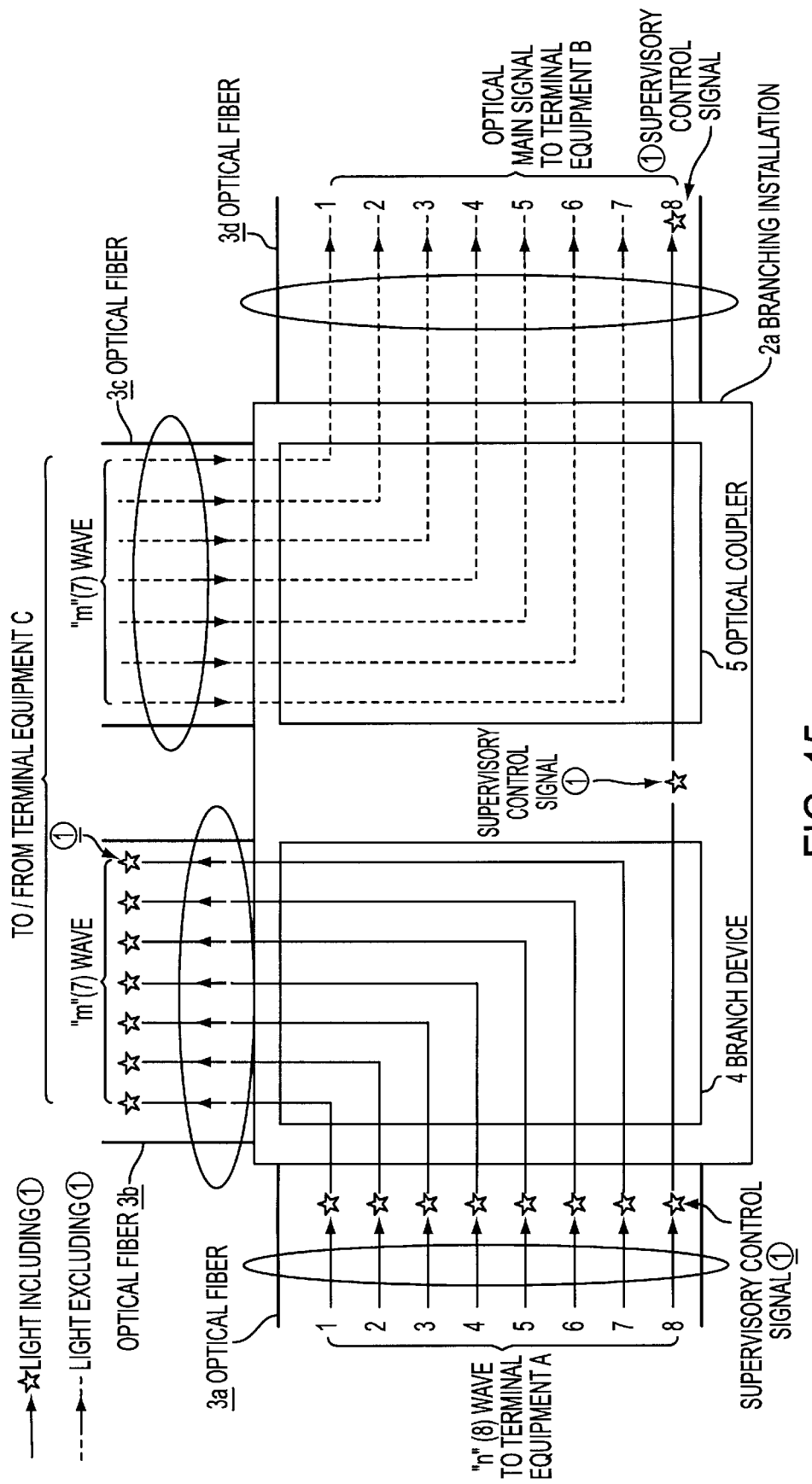
FIG. 15 is a block diagram showing an example of transmitting a supervisory control signal in the case a branching installation is used in the prior art light transmission system.

This embodiment is different from the prior art of FIG. 15 in that the former additionally has an extractor 23 which extracts the supervisory control signal ① included in the eighth wave outputted from the branch device 4 by the optical coupler, and an optical amplifier modulator 27 which receives the output of this extractor 23 and modulates the optical main signal at the output side of the optical coupler 5 with the extracted supervisory control signal ②.

This extractor 23 is formed of an optical coupler 24 which extracts a part of the optical main signal from the optical output signal of the branch device 4, a photo diode circuit (PD) 25 which transduces the optical main signal from the optical coupler 24 into an electric signal, and a band pass filter circuit (BPF) 26 which extracts the frequency band component of the -supervisory control signal ① from the electric main signal generated by the photo diode circuit 25.

Also, the optical amplifying modulator 27 is formed of an excitation LD modulator 29 which receives as an electric input the supervisory control signal ① amplifies and transduces it into an optical signal, and an optical direct amplifier 28 which receives as an input the optical supervisory control signal and amplitude-modulates the optical main signal at the output of the optical coupler 5 with the supervisory control signal ① from the band pass filter circuit 26.

Figure 13:
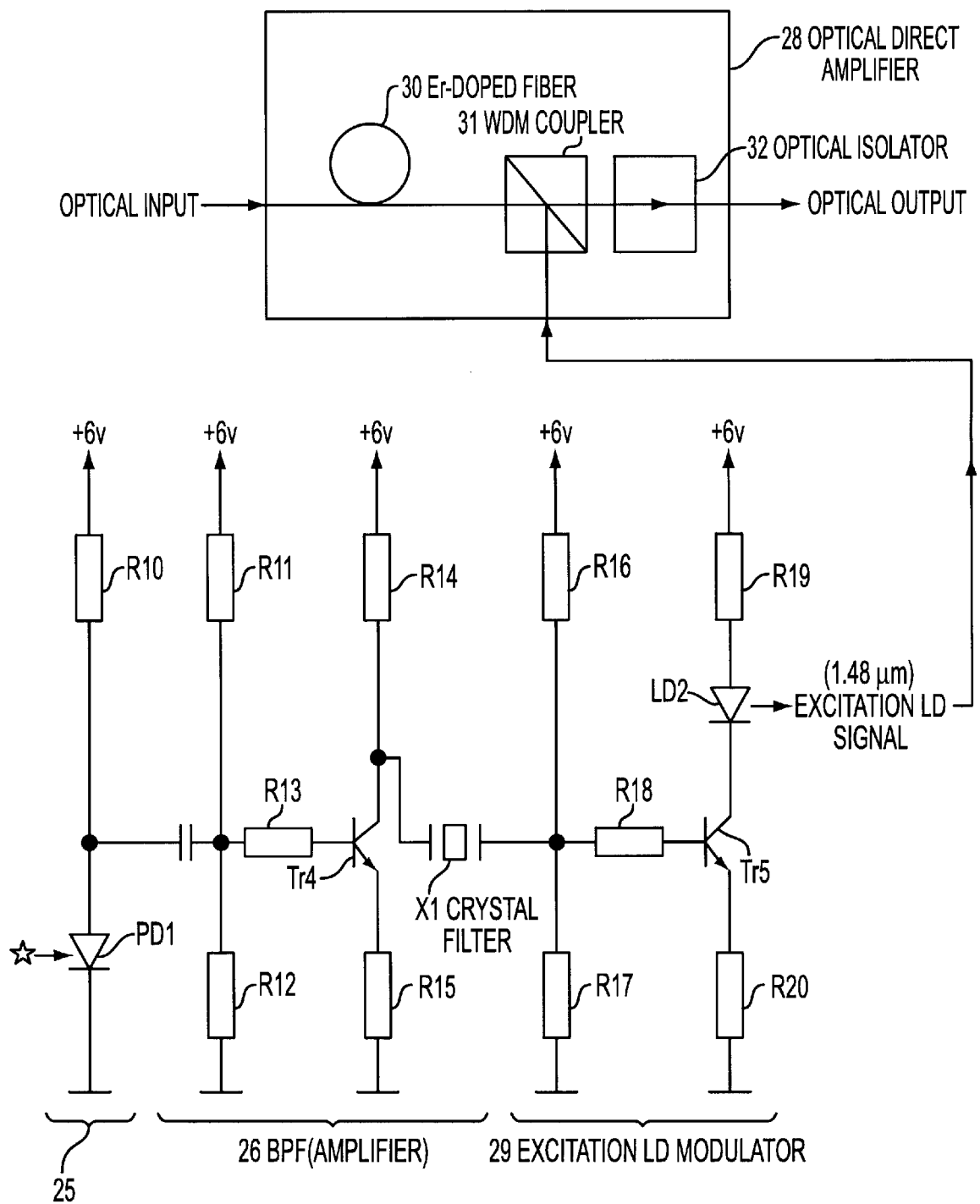
FIG. 13 is a block diagram showing an embodiment of an extractor and an optical amplifying modulator in a branching installation used for a light transmission system according to the present invention.
Figure 14:
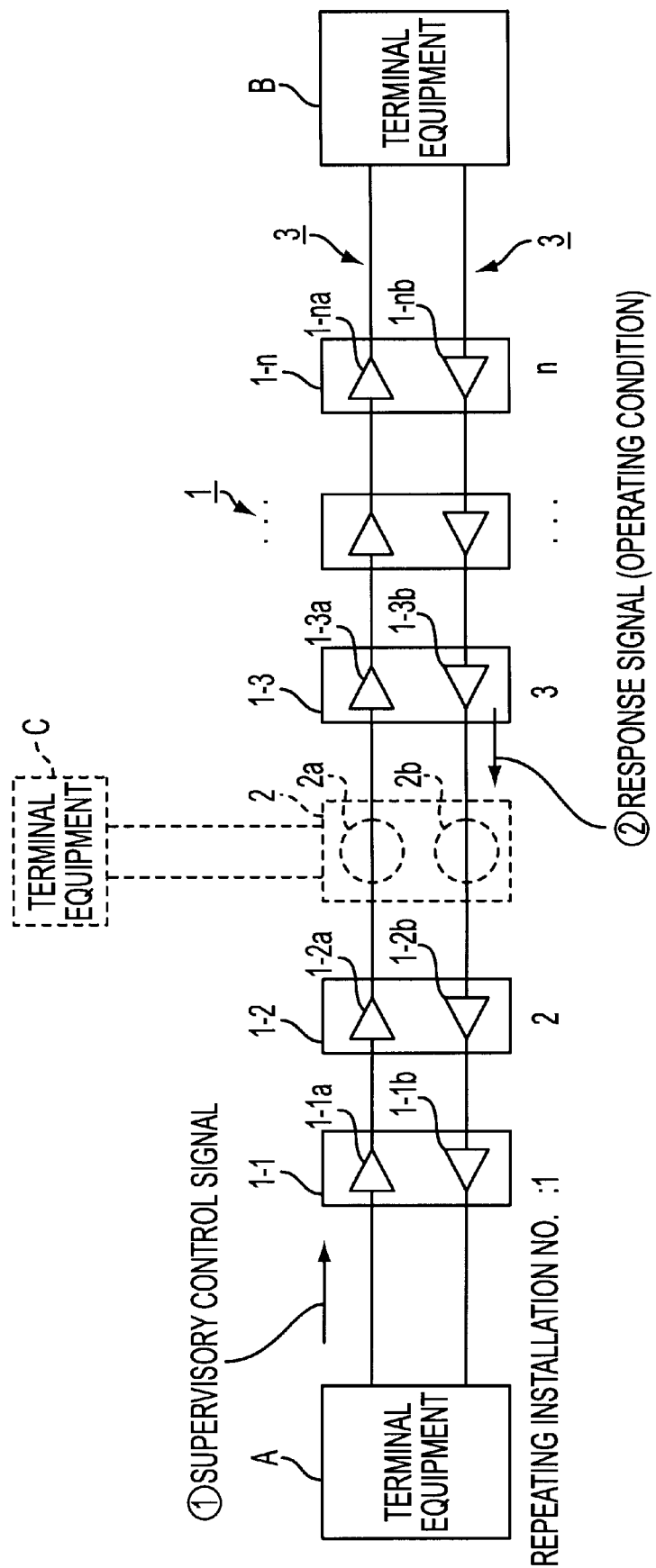
FIG. 14 is a block diagram showing an arrangement of a light transmission system according to the prior art.

FIG. 13 more specifically shows the combined circuit arrangement of the photo diode circuit 25, the band pass filter circuit 26, the excitation LD modulator 29, and the optical direct amplifier 28.

At first, the photo diode device 25 is formed of a resistor R10 and a photo diode PD1, and transduces the optical signal inputted from the optical coupler 24 into an electric signal.

The band pass filter circuit 26 is formed of a coupling condenser C4, voltage-dividing resistors R11, R12, a transistor Tr4, and an input resistor R13 of the transistor Tr4, output resistors R14, R15 of the transistor Tr4, and a crystal filter or mechanical filter X1.

This band pass filter circuit 26 amplifies the electric signal from the photo diode circuit 25 with the transistor Tr4, and passes only the frequency band component of the supervisory control signal with the crystal filter X1.

The excitation LD modulator 29 is formed of voltage-dividing resistors R16, R17, a transistor Tr5, an input resistor R18 of the transistor Tr5, output resistors R19, R20, and an excitation laser diode LD2 serially connected to the output resistors R19, R20.

The excitation LD modulator 29 amplifies the supervisory control signal provided by the crystal filter X1 with the transistor Tr5. The supervisory control signal is transduced into the optical signal with the wavelength of 1.48 $\mu$m by driving the excitation laser diode LD2 and outputted to the WDM coupler 31 of the optical direct amplifier 28.

The optical direct amplifier 28 has a series connection of an Er-deped fiber (EDF) 30, and a WDM coupler 31, and an optical isolator 3S The relationship between the excitation LD modulator 29 and the optical direct amplifier 28 is similar to that of the excitation LD modulator 20 and the optical direct amplifier 15 shown in FIG. 6.

Namely, since the supervisory control signal is extracted at the input of the optical coupler 5 and the optical main signal at the output of the optical coupler 5 is re-modulated with the extracting supervisory control signal, the level of the supervisory control signal decreased due to passing through the branching installation 2a is to be compensated.

Therefore, it becomes possible for the supervisory control signal transmitted from the terminal equipment to surely reach from the branching installation 2a to a remote repeating installation.

As described above, in the light transmission system according to the present invention, each terminal equipment amplitude-modulates an optical main signal with a supervisory control signal of a proper frequency allocated to respective repeating installations. The repeating installations which have received the optical main signal demodulate the supervisory control signal from the optical main signal. The repeating installations detect that the supervisory control contains the own frequency component to judge it as a supervisory control signal addressed to the own installation from the terminal equipment. Alternatively, a branching installation extracts the supervisory control signal before being coupled by an optical coupler in the branching installation, and amplitude-modulates the optical main signal at the output of the optical coupler with the supervisory control signal. Accordingly, the supervisory control signal can be accurately transmitted and received between the terminal equipment and the repeating installations.

What is claimed is:

1. A light transmission system, comprising:
    a first terminal;
    a second terminal connected to the first terminal via an optical fiber; and
    a plurality of repeaters provided in the optical fiber, and detecting different frequencies for detecting respective supervisory controls signals,
    wherein said first terminal comprises:
        a repeater designator designating a specific repeater in said plurality of repeaters,
        an oscillator connected to the repeater designator and oscillating at a frequency corresponding to the designated specific repeater,
        a laser diode connected to the oscillator and outputting laser light at the oscillating frequency of the oscillator, and
        a modulator optically connected to the laser diode and inducing modulation in the oscillating laser light to communicate information of a main signal.

2. The light transmission system as claimed in claim 1, wherein each of the repeaters comprises:
    an optical coupler branching an input optical signal,
    a photo diode changing the input optical signal into an electric signal,
    a filter filtering the frequency of the designated specific repeater, and
    a supervisory control signal detector detecting the supervisory control signal in the electric signal.

3. The light transmission system as claimed in claim 2, wherein when the supervisory control signal is judged by the repeater, the repeater modulates the input optical signal to be transmitted therefrom to the first terminal which has transmitted the supervisory control signal, and transfers a response signal for supervisory control.

4. The light transmission system as claimed in claim 3, wherein the response signal is generated by modulating the input optical signal with a result of the supervisory control in the repeater in the form of PCM data.

5. The light transmission system as claim in claim 1, wherein when a supervisory control signal is judged by the repeater, the repeater modulates an input optical signal to be transmitted therefrom to the first terminal which has transmitted the supervisory control signal, and transfers a response signal for supervisory control.

6. The light transmission system as claimed in claim 5, wherein a modulating frequency for the response signal resides between 5 kHz and 15 kHz.

7. The light transmission system as claimed in claim 6, wherein the response signal is generated by modulating the input optical signal with a result of the supervisory control in the repeater in the form of PCM data.

8. The light transmission system as claimed in claim 5, wherein the response signal is generated by modulating the input optical signal with a result of the supervisory control in the repeater in the form of PCM data.

9. The light transmission system as claimed in claim 1, further comprising:
    a branching installation provided in the optical fiber; and
    a third terminal connected via an optical fiber to the branching installation which branches an optical signal from the first terminal to the third terminal and transfers an optical signal from the third terminal to the second terminal;
    wherein the same frequency as the frequency of the designated specific repeater provided between the first terminal and the branching installation is allocated as the frequency of the designated specific repeater provided between the branching installation and the third terminal.

10. A light transmission system, comprising;
    a first terminal;
    a second terminal connected to the first terminal via an optical fiber;
    a branching installation provided in the optical fiber; and
    a third terminal connected via an optical fiber to the branching installation which branches an optical signal from the first terminal to the third terminal and transfers an optical signal from the third terminal to the second terminal,
    wherein said branching installation comprises:
        an extractor extracting a supervisory control signal contained in an input optical signal to be transmitted from said first terminal to said second terminal, and
        an optical amplifying modulator controlling a gain of a light amplifier in accordance with the supervisory control signal extracted by the extractor, and modulating the optical signal from said third terminal in accordance with the supervisory control signal.

11. The light transmission system as claimed in claim 10, wherein the extractor comprises:

an optical coupler branching the input optical signal, a photo diode changing the input optical signal into an electric signal, and a filter filtering a frequency band component of the supervisory control signal in the electric signal, and wherein the optical amplifying modulator comprises:

an optical direct amplifier as the light amplifier amplifying all optical output signals of an optical coupler connected to the third terminal, and a modulator modulating an amplification factor of the optical direct amplifier with an output signal of the filter.

* * * * *